US010520698B2

(12) United States Patent
Chen et al.

(10) Patent No.: US 10,520,698 B2
(45) Date of Patent: Dec. 31, 2019

(54) RETRACTABLE VIRTUAL REALITY DEVICE

(71) Applicant: Wistron Corporation, New Taipei (TW)

(72) Inventors: Chih-Ping Chen, New Taipei (TW); Yung-Hung Teng, New Taipei (TW); Cheng-Wei Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 189 days.

(21) Appl. No.: 15/698,667

(22) Filed: Sep. 8, 2017

(65) Prior Publication Data

US 2018/0299640 A1   Oct. 18, 2018

(30) Foreign Application Priority Data

Apr. 14, 2017   (TW) .............................. 106112504 A

(51) Int. Cl.
*G02B 27/02* (2006.01)
*G02B 7/06* (2006.01)
(Continued)

(52) U.S. Cl.
CPC .............. *G02B 7/06* (2013.01); *G02B 7/021* (2013.01); *G06T 11/60* (2013.01)

(58) Field of Classification Search
CPC ...... G02B 7/06; G02B 27/0176; G02B 7/021; G02B 2027/0132; G02B 2027/0154; G02B 27/017; G02B 27/0172; G02B 27/0178; G02B 27/0132; G02B 27/0154; G02B 7/12; G02B 23/18; G02B 2027/0134; G02B 2027/0159; G02B 2027/0178; G06T 11/60

USPC .............. 359/480, 630, 632, 466; 40/611.07; 345/7, 8, 53, 174; 348/115; 396/448, 396/536

See application file for complete search history.

(56) References Cited

U.S. PATENT DOCUMENTS

2007/0171524 A1* 7/2007 Steinthal .................. G02B 7/06
359/466

FOREIGN PATENT DOCUMENTS

CN        204906466 U       12/2015
KR     20170001130 U    *  3/2017

OTHER PUBLICATIONS

Office action dated Aug. 23, 2017 for the Taiwan application No. 106112504, filing date: Apr. 14, 2017, p. 1 line 1-14, p. 2 and p. 3 line 1-11.

* cited by examiner

*Primary Examiner* — Mustak Choudhury
(74) *Attorney, Agent, or Firm* — Winston Hsu

(57) ABSTRACT

A retractable virtual reality device includes a rear cover, a front cover, a first restraining component, a second restraining component, and a display module. The front cover is movably combined with the rear cover. The first restraining component is fixed on the front cover. The second restraining component is movably disposed on the rear cover and for restraining the first restraining component. The display module includes a sleeve, a lens, and a display. The sleeve is fixed on the rear cover. The lens is disposed on a side of the sleeve. The display is disposed on the front cover and movably combined with the other side of the sleeve. By cooperation of the first restraining component and the second restraining component, the display and the front cover are movable relative to the lens and the rear cover, which reduces an overall size of the virtual reality device for easy carry.

14 Claims, 14 Drawing Sheets

(51) Int. Cl.
*G02B 7/02* (2006.01)
*G06T 11/60* (2006.01)

RETRACTABLE VIRTUAL REALITY DEVICE

BACKGROUND OF THE INVENTION

1. Field of the Invention

The present invention relates to a virtual reality device, and more particularly, to a retractable virtual reality device.

2. Description of the Prior Art

With advance of technology, virtual reality devices are commonly used in different fields. A virtual reality device utilizes two displays for providing images for a user's two eyes to create a three-dimensional effect by binocular disparity. However, in order to meet focal length of the user's eyes, two lens assemblies and two displays of the conventional virtual reality device should be spaced from the eyes at predetermined distances when the user wears the virtual reality device. Therefore, due to limitations of mechanical space and optical imagery, the conventional virtual reality device is often large and heavy, which is difficult to carry and store.

SUMMARY OF THE INVENTION

Therefore, an objective of the present invention is to provide a retractable virtual reality device for solving the aforementioned problems.

In order to achieve the aforementioned objective, the present invention discloses a retractable virtual reality device including a rear cover, a front cover, a first restraining component, a second restraining component, and a display module. The front cover is movably combined with the rear cover. The front cover is movable relative to the rear cover between a using position and a folding position along a first direction and a second direction opposite to the first direction. The first restraining component is disposed on the front cover. The second restraining component is movably disposed on the rear cover to optionally restrain the first restraining component. The display module includes at least one lens assembly and at least one display component. The at least one lens assembly is disposed on the rear cover. The at least one display component is disposed on the front cover and spaced away from the at least one lens assembly at a distance. When the second restraining component is driven by an external force to disengage from the first restraining component, the front cover is allowed to move relative to the rear cover between the using position and the folding position to drive the at least one display component to move relative to the at least one lens assembly to adjust the distance, and when the front cover is located at the using position or at the folding position relative to the rear cover, the second restraining component is driven to restrain the first restraining component to prevent the front cover from moving relative to the rear cover, so that the at least one display component is restrained from moving relative to the at least one lens assembly to fix the distance.

According to an embodiment of the present invention, the display module further includes at least one socket component. A side of the at least one socket component is adjacent to the at least one lens assembly and installed on the rear cover together with the at least one lens assembly, and another side of the at least one socket component opposite to the side of the at least one socket component is adjacent to the at least one display component.

According to an embodiment of the present invention, the display module further includes at least one socket component. A side of the at least one socket component is adjacent to the at least one display component and installed on the front cover together with the at least one display component, and another side of the at least one socket component opposite to the side of the at least one socket component is adjacent to the at least one lens assembly.

According to an embodiment of the present invention, the retractable virtual reality device further includes a first operating component disposed on the rear cover in a movable manner along a third direction perpendicular to the first direction and connected to the second restraining component. The first operating component drives the second restraining component to move along the third direction so as to disengage the second restraining component from the first restraining component when the first operating component is driven by the external force.

According to an embodiment of the present invention, the retractable virtual reality device further includes at least one first recovering component disposed between the second restraining component and the rear cover to bias the second restraining component to recover along a fourth direction opposite to the third direction.

According to an embodiment of the present invention, the at least one first recovering component drives the second restraining component to restrain the first restraining component when the front cover is located at the using position or the folding position relative to the rear cover.

According to an embodiment of the present invention, the retractable virtual reality device further includes a second operating component disposed on the rear cover in a movable manner along the third direction. The second operating component pushes the second restraining component to move along the third direction to disengage the second restraining component from the first restraining component during a process that the second operating component moves relative to the rear cover along the third direction to engage with the front cover.

According to an embodiment of the present invention, the second operating component includes an operating portion, an abutting portion, and a hook portion. The operating portion is exposed out of the rear cover. The abutting portion is connected to the operating portion to push the second restraining component. The hook portion is connected to the operating portion to engage with the front cover. The operating portion drives the abutting portion to push the second restraining component to move along the third direction to disengage the second restraining component from the first restraining component during a process that the operating portion drives the hook portion to move along the third direction to engage with the front cover.

According to an embodiment of the present invention, an engaging portion is formed on the front cover. When the front cover is located at the using position relative to the rear cover, the engaging portion is aligned with the hook portion along the third direction, so that the hook portion driven by the operating portion engages with the engaging portion. When the front cover is located at the folding position relative to the rear cover, the engaging portion is not aligned with the hook portion along the third direction, so that the hook portion driven by the operating portion is prevented from engaging with the engaging portion.

According to an embodiment of the present invention, the retractable virtual reality device further includes a second recovering component disposed between the second operating component and the rear cover to bias the second operating component to recover along the fourth direction opposite to the third direction.

According to an embodiment of the present invention, the retractable virtual reality device further includes at least one resilient component disposed between the front cover and the rear cover. The at least one resilient component drives the front cover to move relative to the rear cover to the using position along the first direction when the second restraining component disengages from the first restraining component.

According to an embodiment of the present invention, the retractable virtual reality device further includes at least one positioning column. An end of the at least one positioning column passes through the first restraining component to be fixed onto the front cover. Another end of the at least one positioning column is movably connected to the rear cover. The at least one resilient component is sheathed on the at least one positioning column, and two ends of the at least one resilient component abut against the first restraining component and the rear cover respectively.

According to an embodiment of the present invention, a sectional area of the at least one positioning column gradually increases along the second direction.

According to an embodiment of the present invention, the display module includes two socket components parallel to each other, two lens assemblies parallel to each other, and two display components parallel to each other.

In summary, the retractable virtual reality device of the present invention utilizes cooperation of the second restraining component movable disposed on the rear cover and the first restraining component disposed on the front cover for allowing the display component and the front cover to move relative to the rear cover. In such a way, when it is desired to use the retractable virtual reality device, the second restraining component can be operated to allow the front cover to move to the using position relative to the rear cover for extending the distance between the display component and the lens assembly. When the retractable virtual reality device is not in use, the second restraining component can be operated to allow the front cover to move to the folding position relative to the rear cover for shortening the distance between the display component and the lens assembly. Therefore, an overall size of the retractable virtual reality device can be reduced after being folded, which takes advantages of easy carry and storage.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
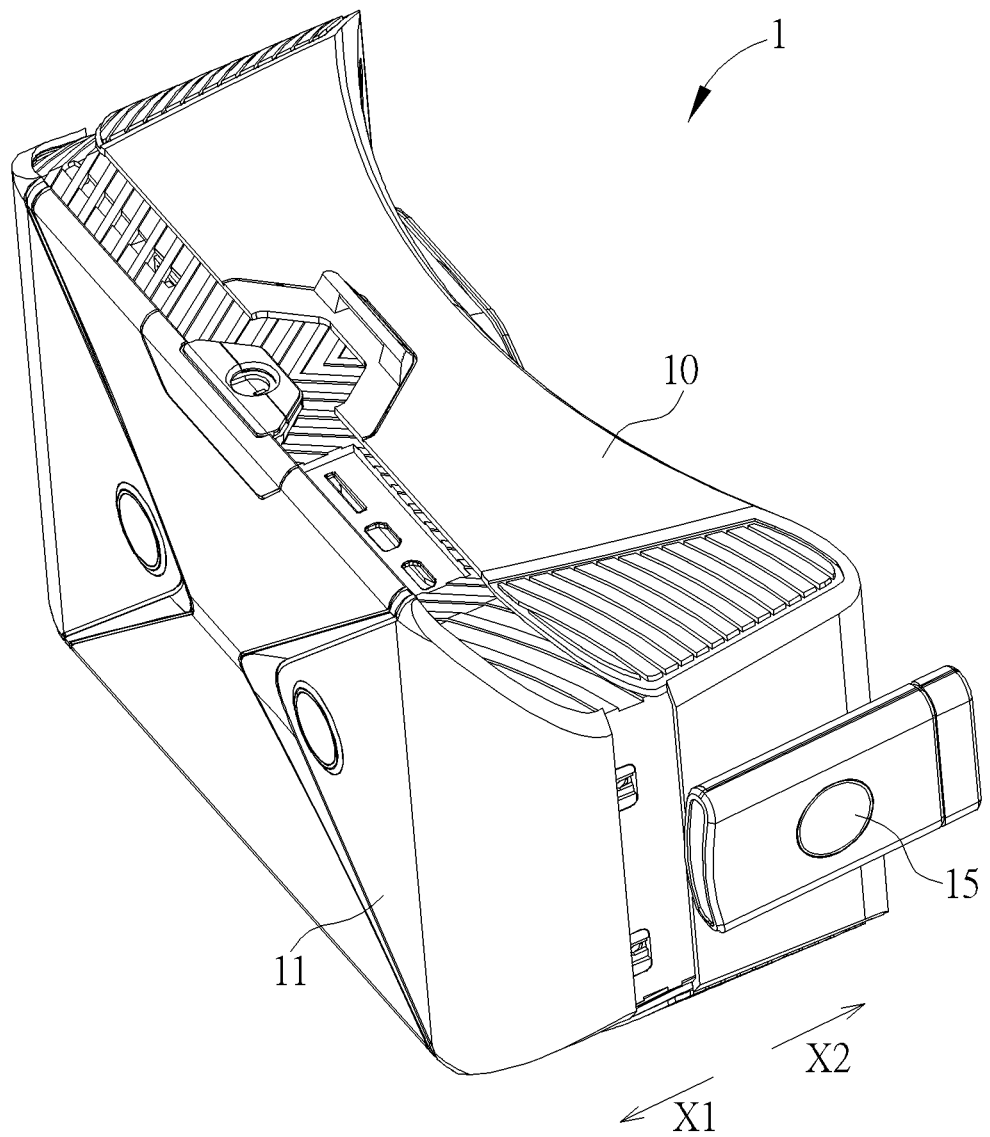
FIG. 1 is a schematic diagram of a retractable virtual reality device at a using state according to an embodiment of the present invention.
Figure 2:
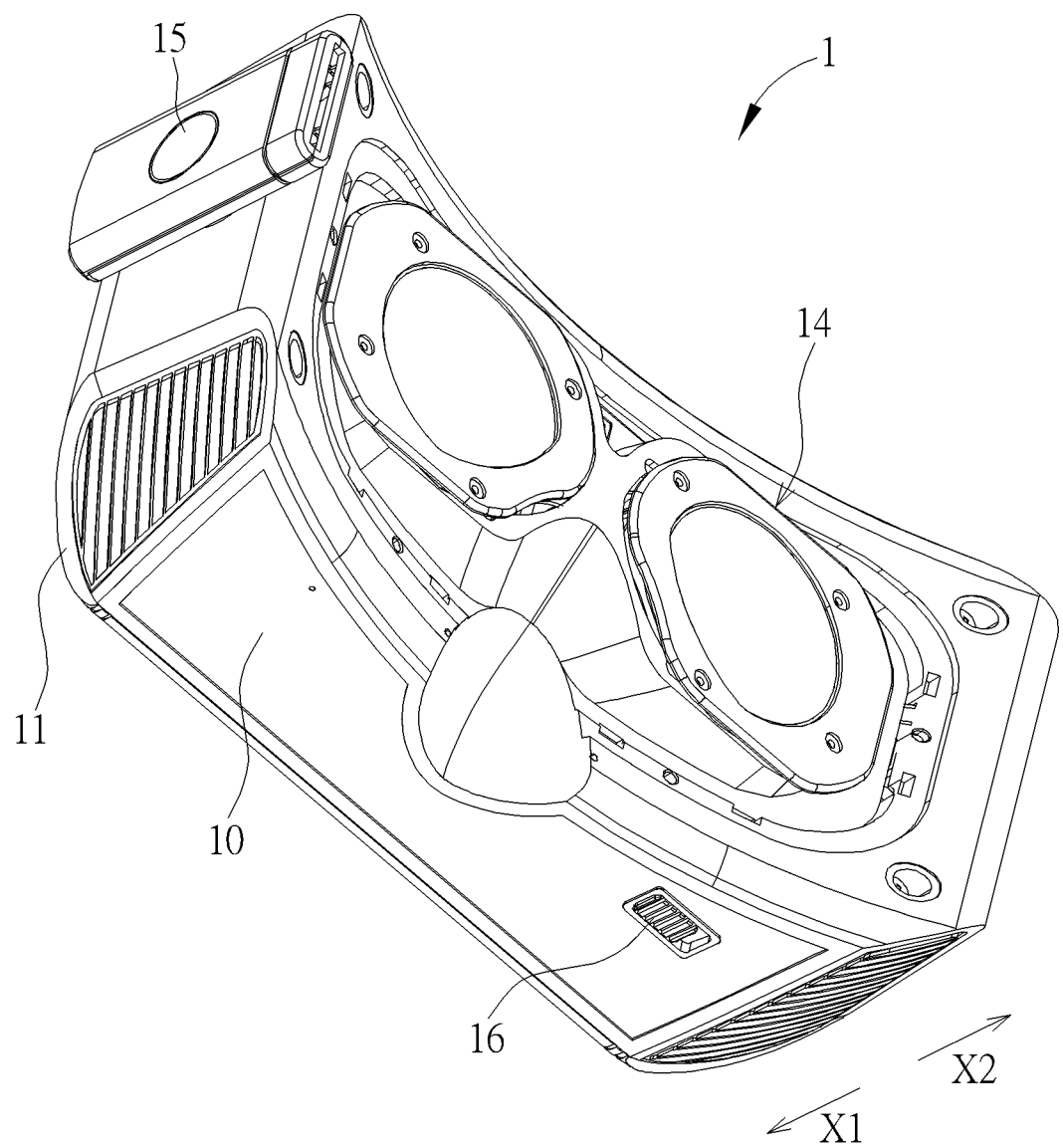
FIG. 2 is a schematic diagram of the retractable virtual reality device at a folding state according to the embodiment of the present invention.
Figure 3:
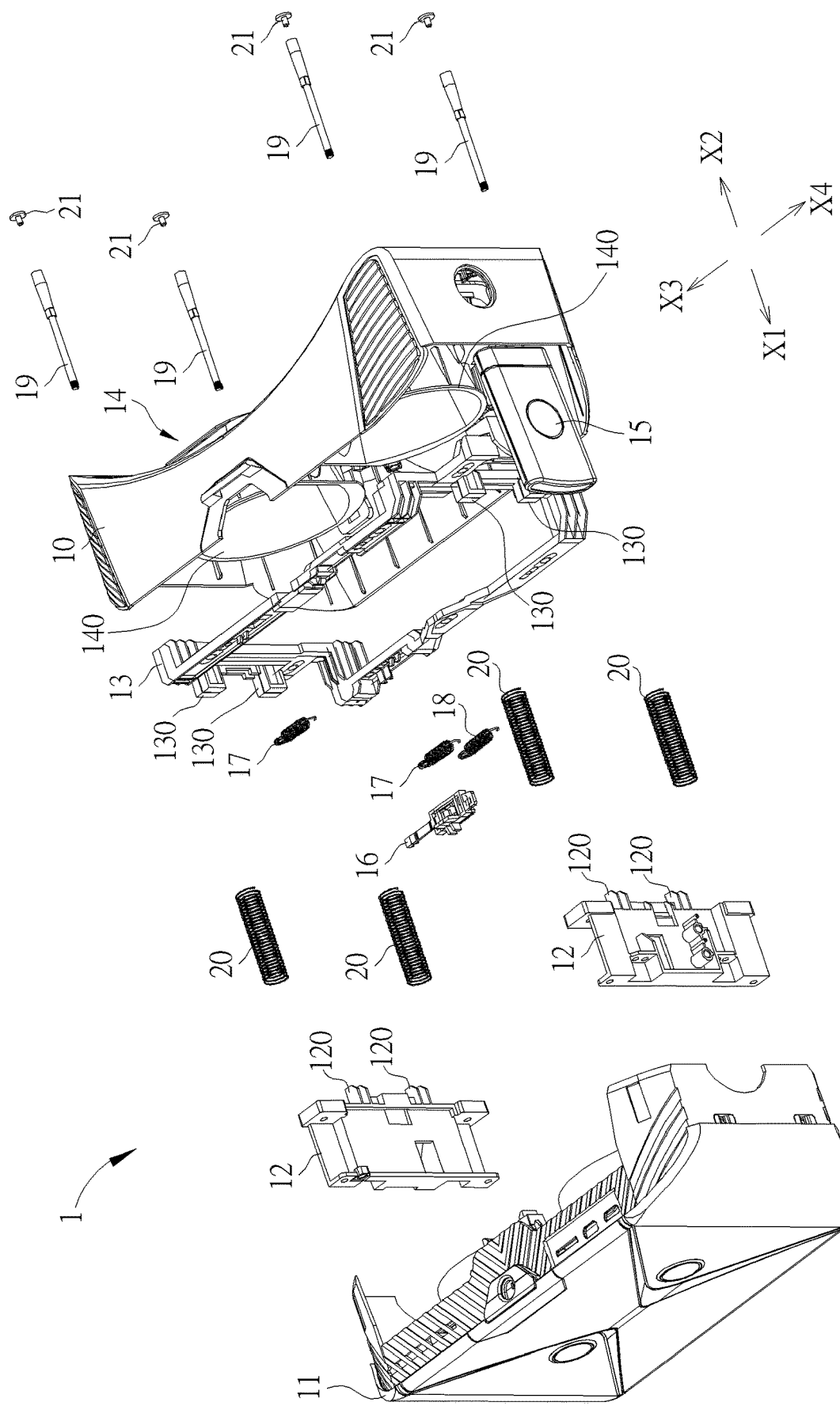
FIG. 3 and FIG. 4 are exploded diagrams of the retractable virtual reality device at different views according to the embodiment of the present invention.
Figure 4:
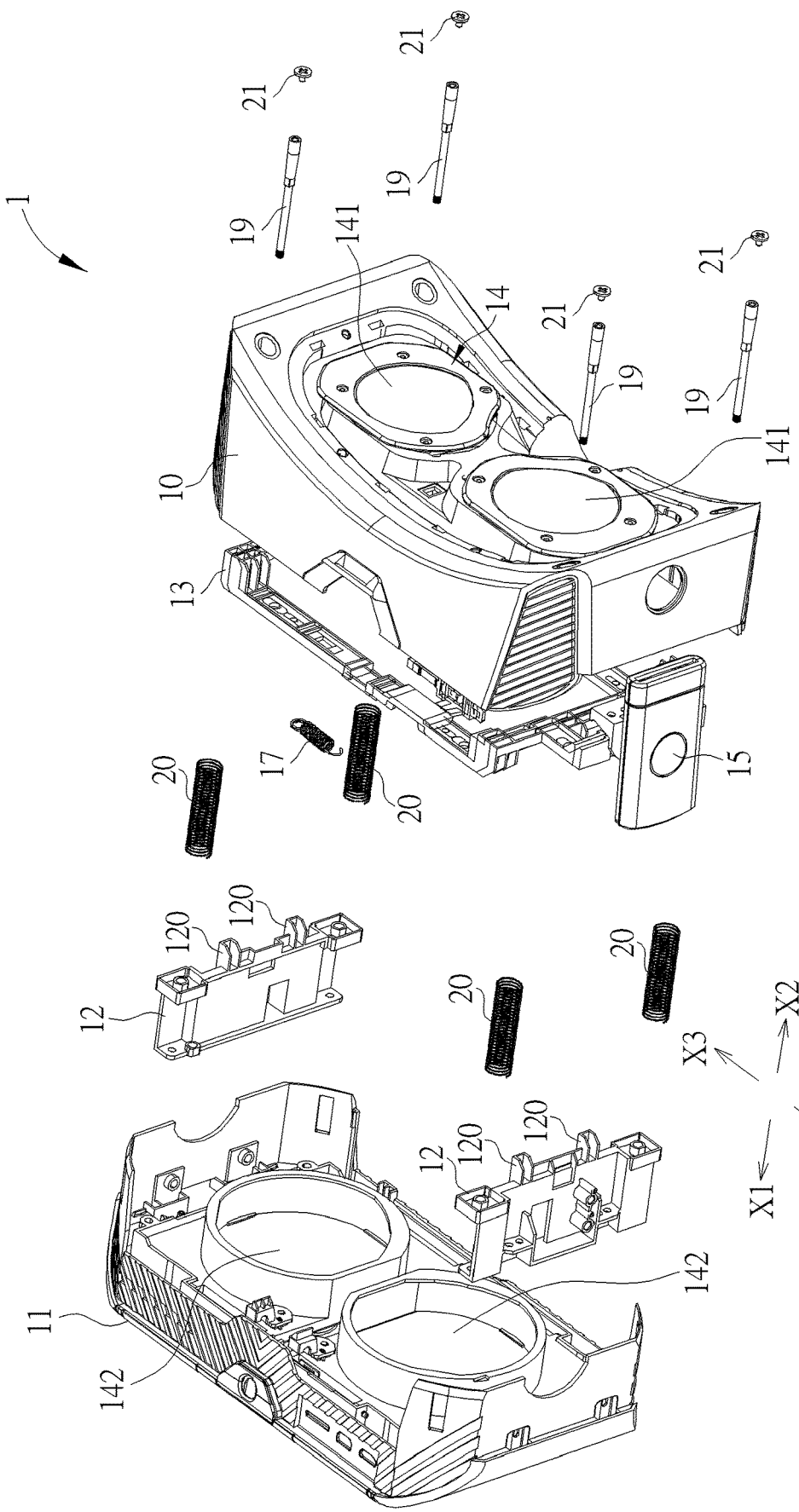

Please refer to FIG. 1 to FIG. 4. FIG. 1 is a schematic diagram of a retractable virtual reality device 1 at a using state according to an embodiment of the present invention. FIG. 2 is a schematic diagram of the retractable virtual reality device 1 at a folding state according to the embodiment of the present invention. FIG. 3 and FIG. 4 are exploded diagrams of the retractable virtual reality device 1 at different views according to the embodiment of the present invention. As shown in FIG. 1 to FIG. 4, the retractable virtual reality device 1 includes a rear cover 10, a front cover 11, two first restraining components 12, a second restraining component 13, a display module 14, a first operating component 15, a second operating component 16, two first recovering components 17, a second recovering component 18, four positioning columns 19, four resilient components 20, and four fastening components 21. The front cover 11 is movably combined with the rear cover 10. The two first restraining components 12 are respectively disposed on a left side and a right side of the front cover 11. The second restraining component 13 is movably disposed on the rear cover 10 to restrain the two first restraining components 12. Specifically, in this embodiment, as shown in FIG. 3 and FIG. 4, each of the two first restraining components 12 includes two protruding structures 120. Two recess structures 130 are formed on each of a left side and a right side of the second restraining component 13 and located at positions corresponding to the two protruding structures 120 of the corresponding first restraining component 12. By cooperation of the recess structures 130 and the protruding structures 120, the second restraining component 13 can allow the two first restraining components 12 to move relative to the second restraining component 13 or restrain the two first restraining components 12 from moving relative to the second restraining component 13 selectively, so as to allow the front cover 11 to move relative to the rear cover 10 or restrain the front cover 11 from moving relative to the rear cover 10. However, the numbers and the structures of the first restraining component 12 and the second restraining component 13 are not limited to those illustrated in figures of this embodiment. It depends on practical demands. For example, in another embodiment, the retractable virtual reality device 1 also can include only one first restraining component 12 selectively disposed on one of the left side and the right side of the front cover 11.

The four positioning columns 19 are located between four corners of the front cover 11 and four corners of the rear cover 10 for guiding the front cover 11 to move relative to the rear cover 10 along a first direction X1 or a second direction X2 opposite to the first direction X1. An end of each of the four positioning columns 19 passes through the corresponding first restraining component 12 to be fixed onto the corresponding corner of the front cover 11. Another end of each of the four positioning columns 19 is movably connected to the corresponding corner of the rear cover 10 by the corresponding fastening component 21. The four resilient components 20 are sheathed on the four positioning columns respectively, and two ends of each of the four resilient components 20 abut against the corresponding first restraining component 12 and the rear cover 10 respectively, so as to bias the front cover 11 to move to a using position relative to the rear cover 10 along the first direction X1. Furthermore, the resilient component 20, the first recovering component 17, and the second recovering component 18 can be springs.

Furthermore, in this embodiment, a sectional area of each of the four positioning columns 19 can preferably gradually increase along the second direction X2, so that the front cover 11 can be aligned with the rear cover 10 when the front cover 11 moves relative to the rear cover 10 along the first direction X1 and the second direction X2. However, the structures and the numbers of the first restraining component 12, the positioning column 19, and the resilient component 20 are not limited to those illustrated in figures of this embodiment. It depends on practical demands. For example, in another embodiment, the retractable virtual reality device 1 also can only include one positioning column 19 and one resilient component 20.

Figure 5:
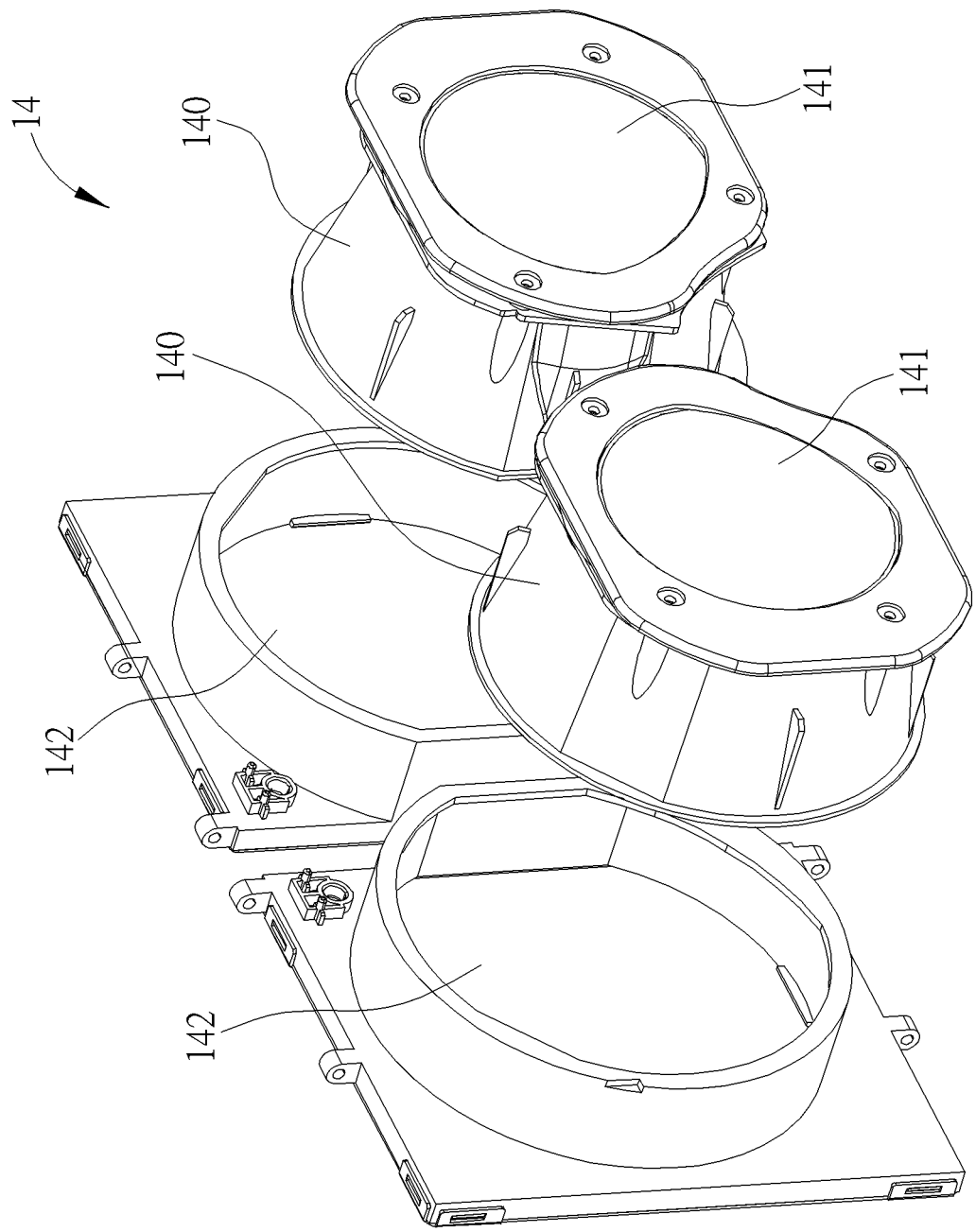
FIG. 5 is a diagram of a display module according to the embodiment of the present invention.
Figure 6:
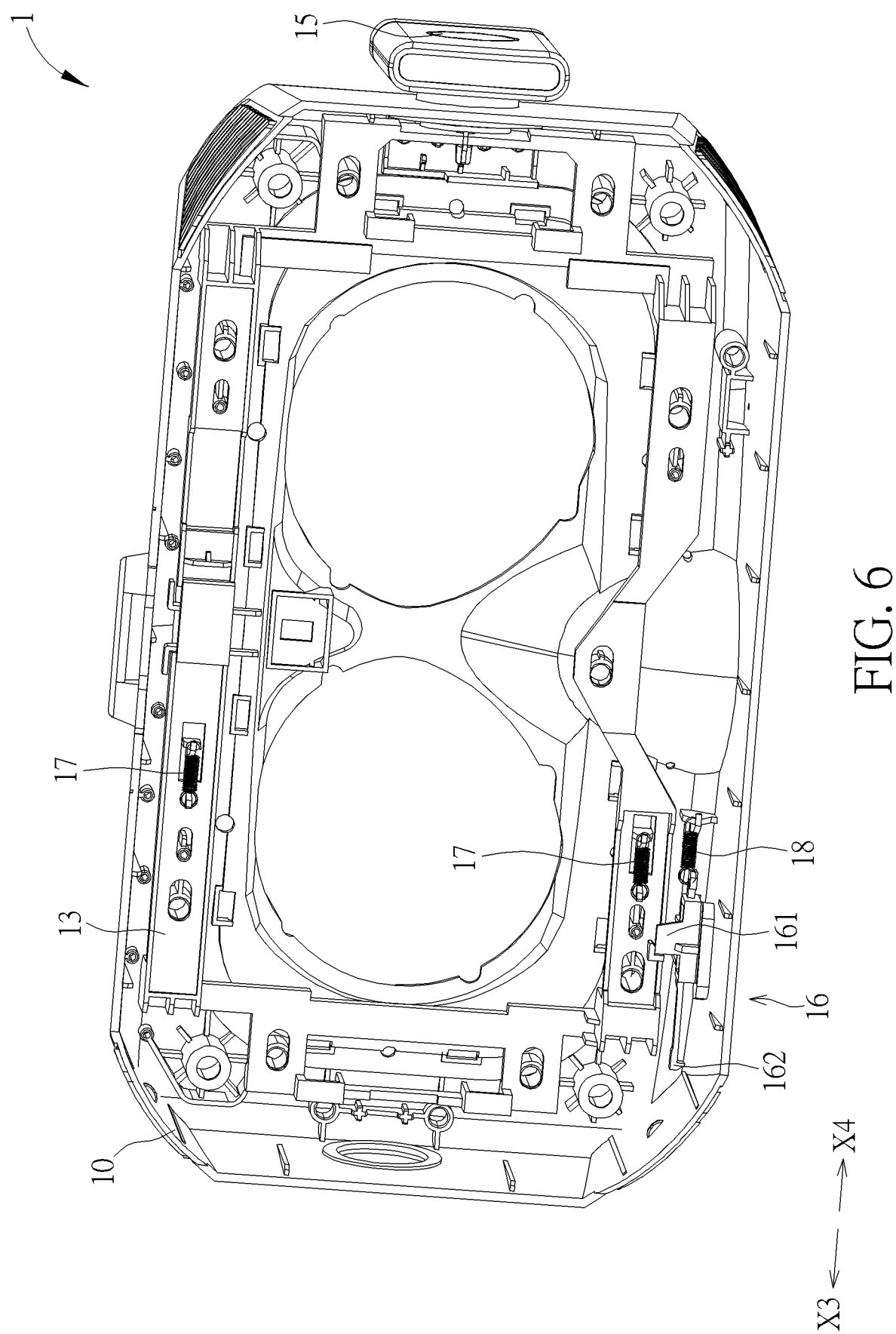
FIG. 6 to FIG. 9 are partial internal structural diagrams of the retractable virtual reality device at different states according to the embodiment of the present invention.
Figure 14:
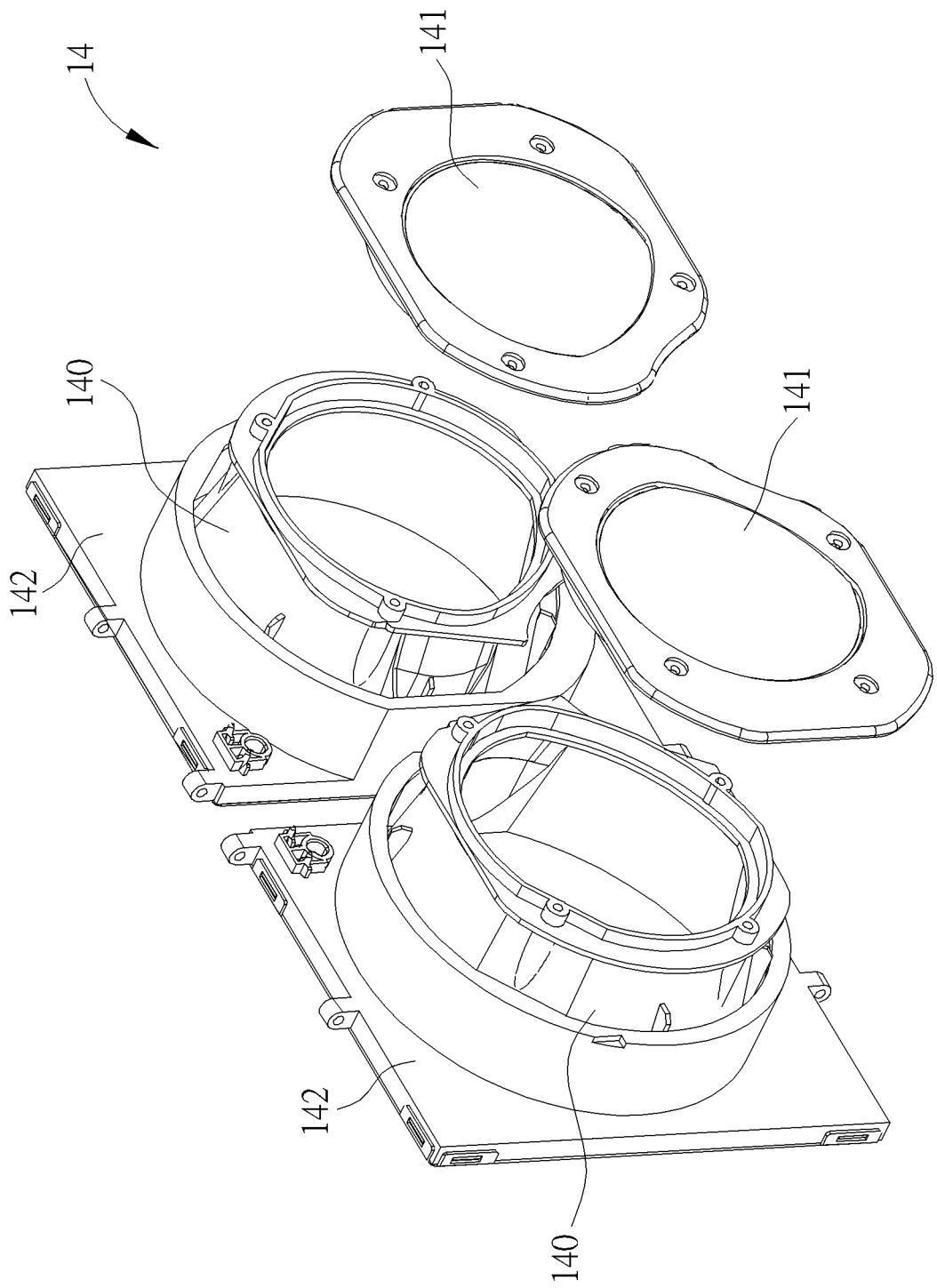
FIG. 14 is a diagram of a display module according to another embodiment of the present invention.

Please refer to FIG. 3 to FIG. 5. FIG. 5 is a diagram of the display module 14 according to the embodiment of the present invention. As shown in FIG. 3 to FIG. 5, the display module 14 includes two socket components 140, two lens assemblies 141 and two display components 142. The two socket components 140 are fixed onto the rear cover 10 and parallel to each other. Each of the two lens assemblies 141 is disposed on a side of the corresponding socket component 140. Each of the two display components 142 is disposed on the front cover 11 and movably combined with another side of the corresponding socket component 140 opposite to the side of the corresponding socket component 140. In this embodiment, the two display components 142 can be two transparent organic light emitting diode displays or two transparent liquid crystal displays for displaying images. The two lens assemblies 141 can be two convex lens assemblies 141 for focusing the images onto retinas of a user's eyes. The two display components 142 can be slidably sleeved on the two socket components 140 respectively, so that the two display components 142 can be driven by the front cover 11 to move relative to the two socket components 140 along the first direction X1 or the second direction X2, so as to adjust distances between the two display components 142 and the corresponding two lens assemblies 141. However, the structures and the configurations of the socket component 140, the lens assembly 141, and the display component 142 are not limited to this embodiment. It depends on practical demands. For example, please refer to FIG. 14. FIG. 14 is a diagram of the display module 14 according to another embodiment of the present invention. In this embodiment, each of the two socket components 140 can be combined with the corresponding display component 142 and installed on the front cover 11 together with the corresponding display component 142, and the two lens assemblies 141 are installed on the rear cover 10.

Furthermore, the first operating component 15 is movably disposed on the rear cover 10 along a third direction X3 perpendicular to the first direction X1 and connected to the second restraining component 13 for driving the second restraining component 13 to move along the third direction X3. The two first recovering components 17 are disposed between an upper side of the second restraining component 13 and the rear cover 10 and between a lower side of the second restraining component 13 and the rear cover 10, respectively, so as to bias the second restraining component 13 to recover along a fourth direction X4 opposite to the third direction X3.

Please refer to FIG. 6 to FIG. 9. FIG. 6 to FIG. 9 are partial internal structural diagrams of the retractable virtual reality device 1 at different states according to the embodiment of the present invention. In order to illustrate structure of the second operating component 16 more specifically, FIG. 6 to FIG. 9 only illustrate partial components of the retractable virtual reality device 1. As shown in FIG. 6 to FIG. 9, an engaging portion 110 is formed on the front cover 11. The second operating component 16 includes an operating portion 160, an abutting portion 161, and a hook portion 162. The operating portion 160 is exposed out of the rear cover 10. The abutting portion 161 is connected to the operating portion 160 for pushing the second restraining component 110. The hook portion 162 is connected to the operating portion 160 for engaging with the engaging portion 110. The second recovering component 18 is disposed between the second operating component 16 and the rear cover 10, so as to bias the second operating component 16 to recover along the fourth direction X4 opposite to the third direction X3.

Figure 7:
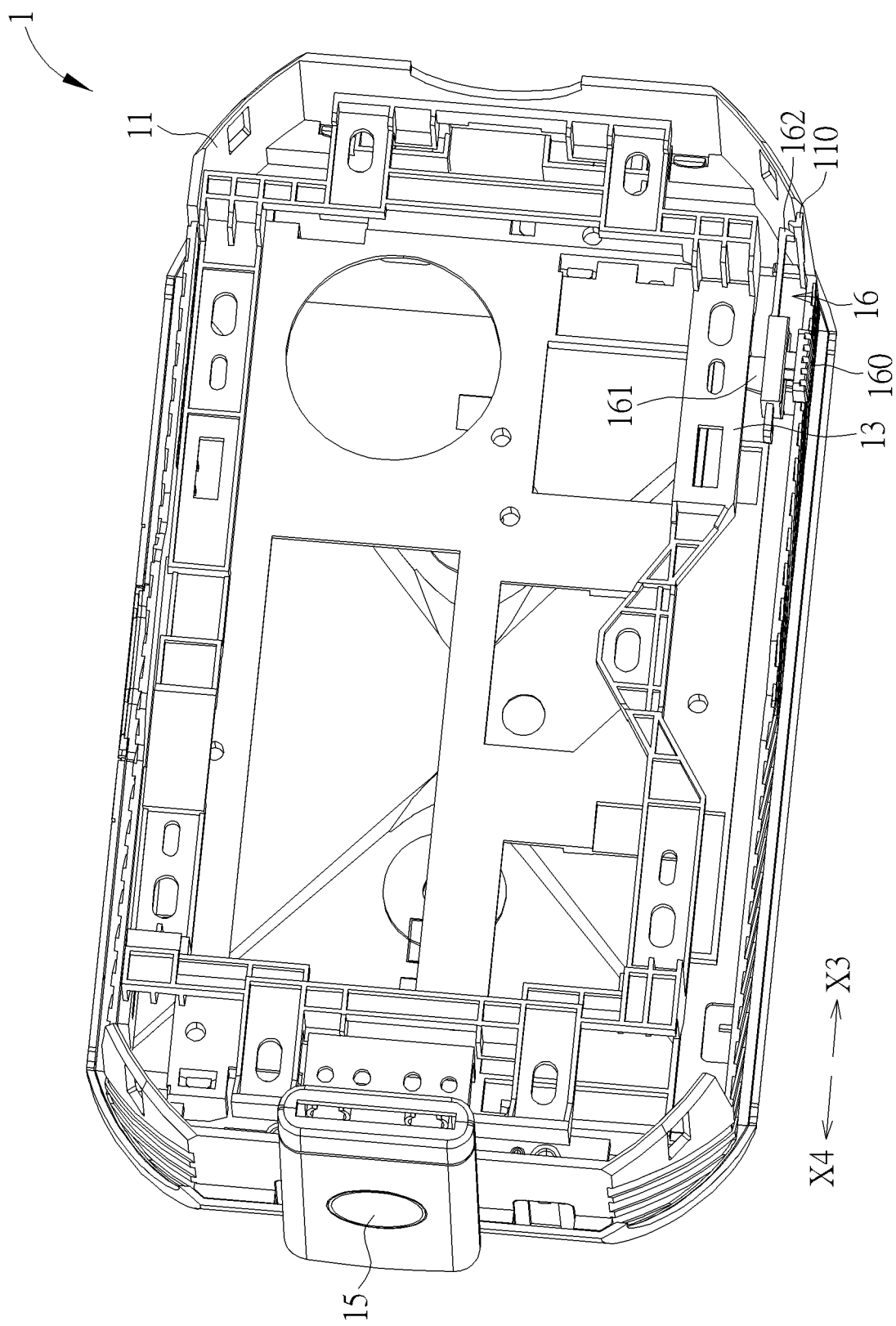
Figure 8:
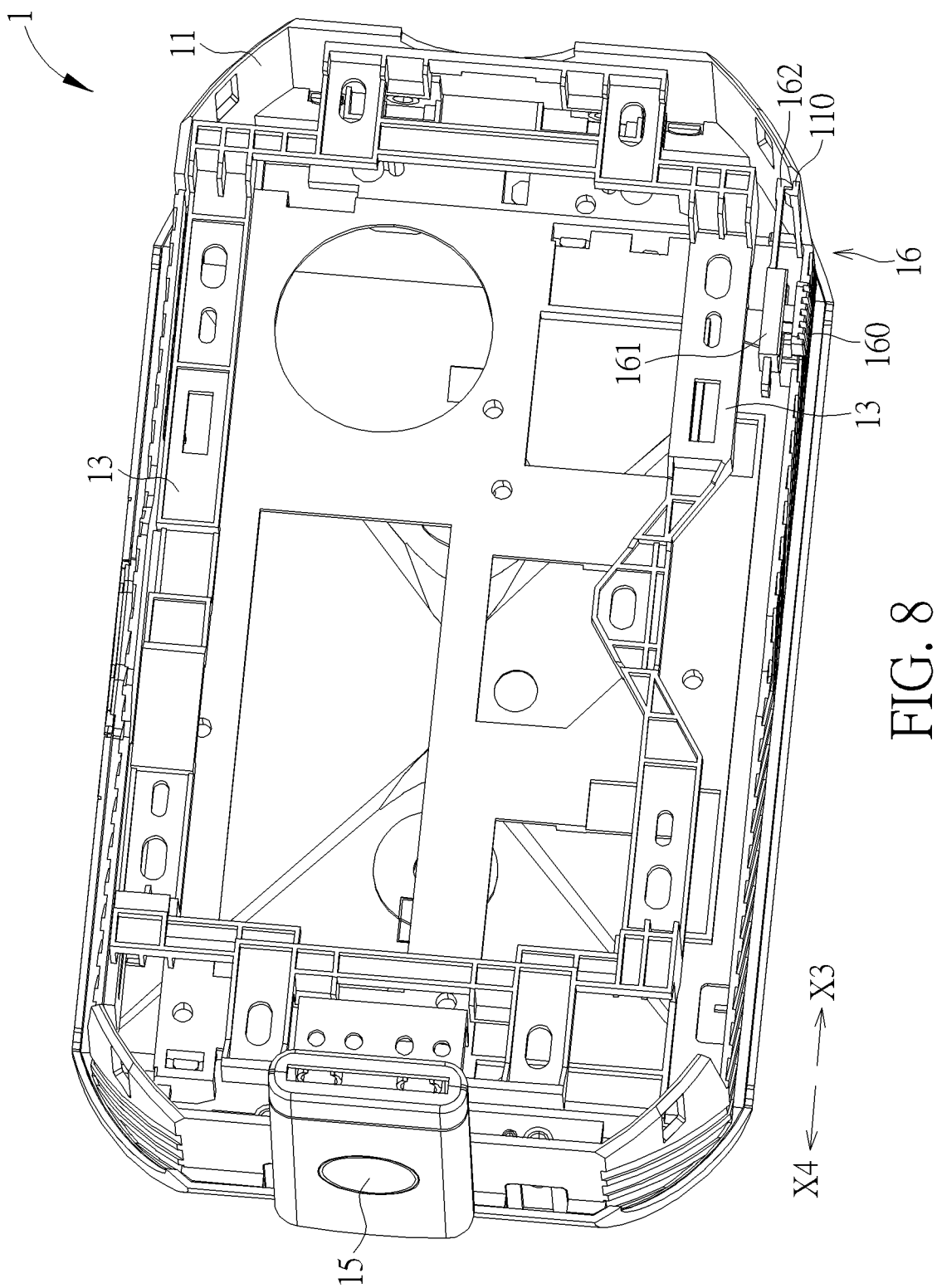
Figure 9:
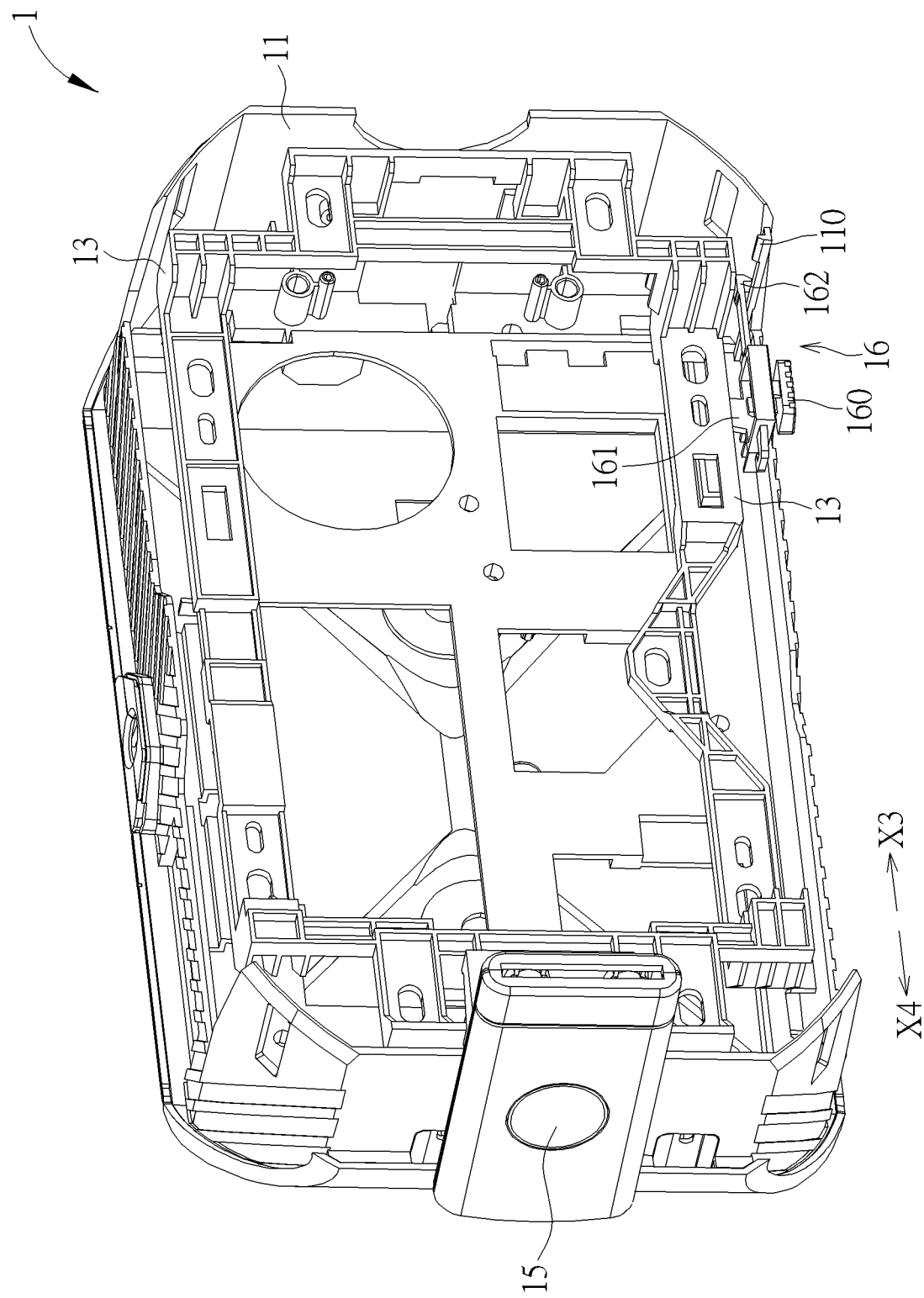

It should be noticed that, as shown in FIG. 7 and FIG. 8, when the front cover 11 is located at the using position relative to the rear cover 10, the engaging portion 110 is aligned with the hook portion 162 along the third direction X3, so that the hook portion 162 can be driven by the operating portion 160 to engage with the engaging portion 110. As shown in FIG. 9, when the front cover 11 is not located at the using position relative to the rear cover 10, i.e., when the front cover 11 leaves from the using position, the engaging portion 110 is not aligned with the hook portion 162 along the third direction X3, so that the hook portion 162 cannot be driven to engage with the engaging portion 110 by the operating portion 160.

Figure 10:
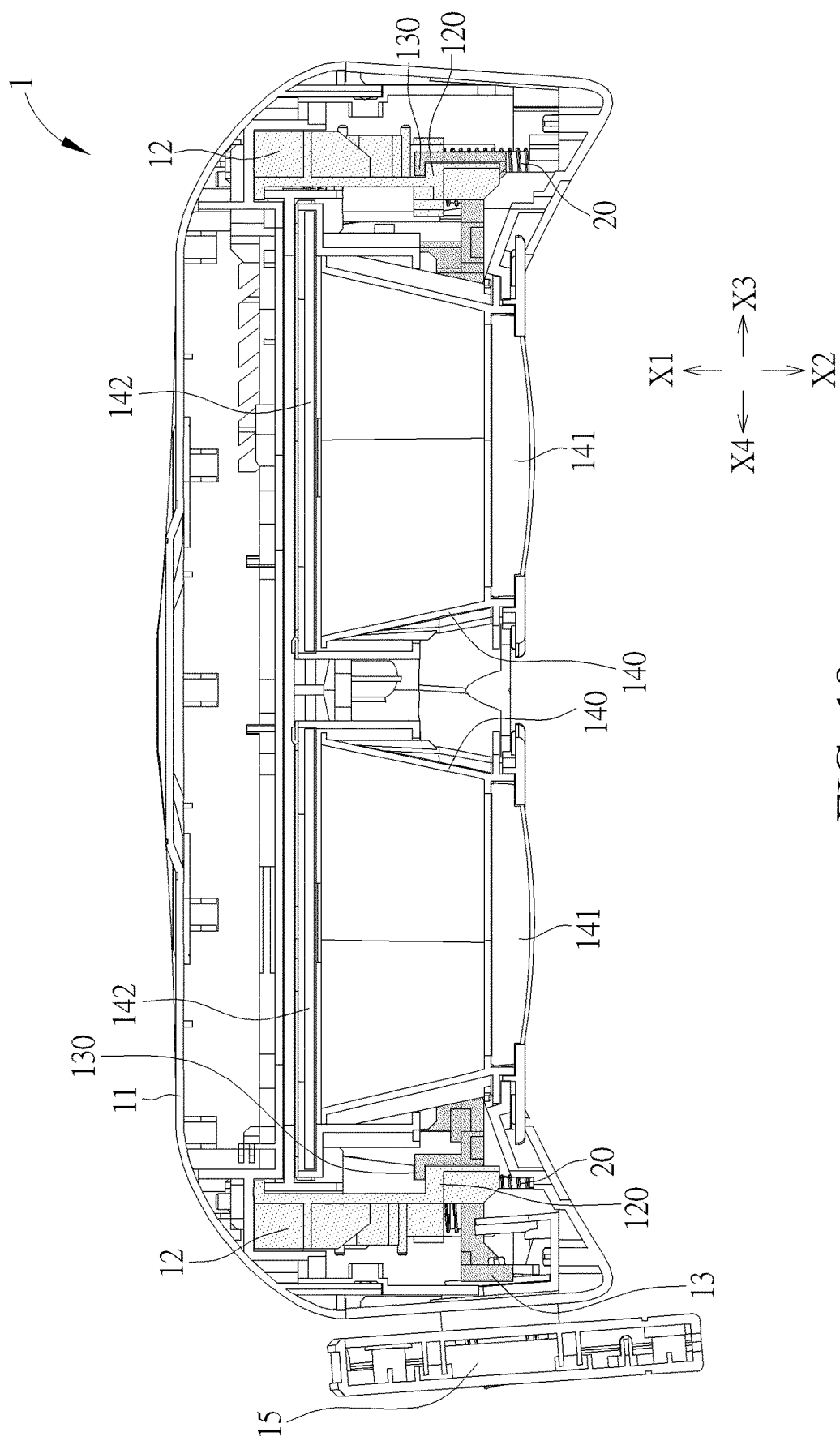
FIG. 10 to FIG. 13 are diagrams of the retractable virtual reality device at different states according to the embodiment of the present invention.
Figure 11:
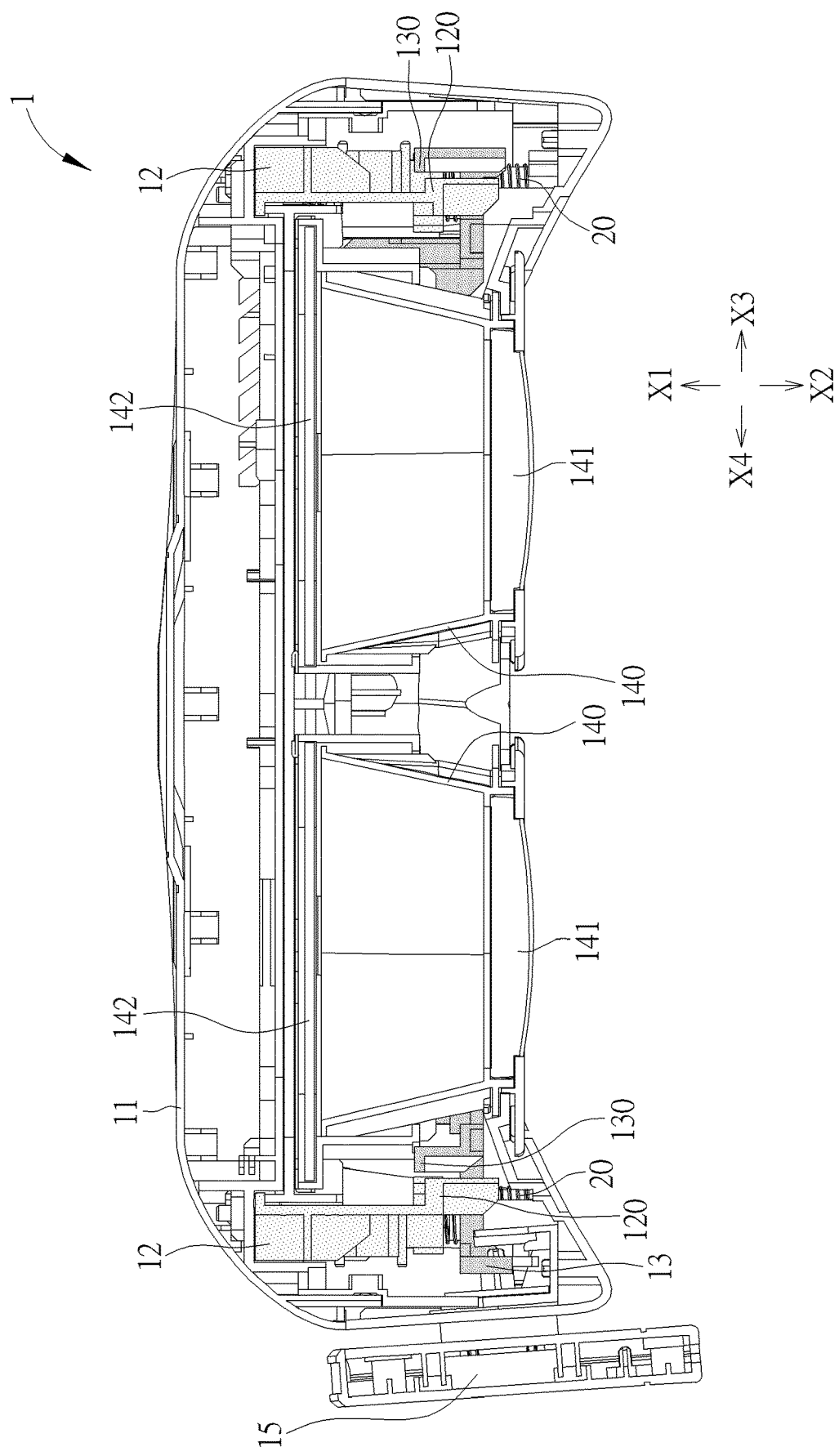
Figure 12:
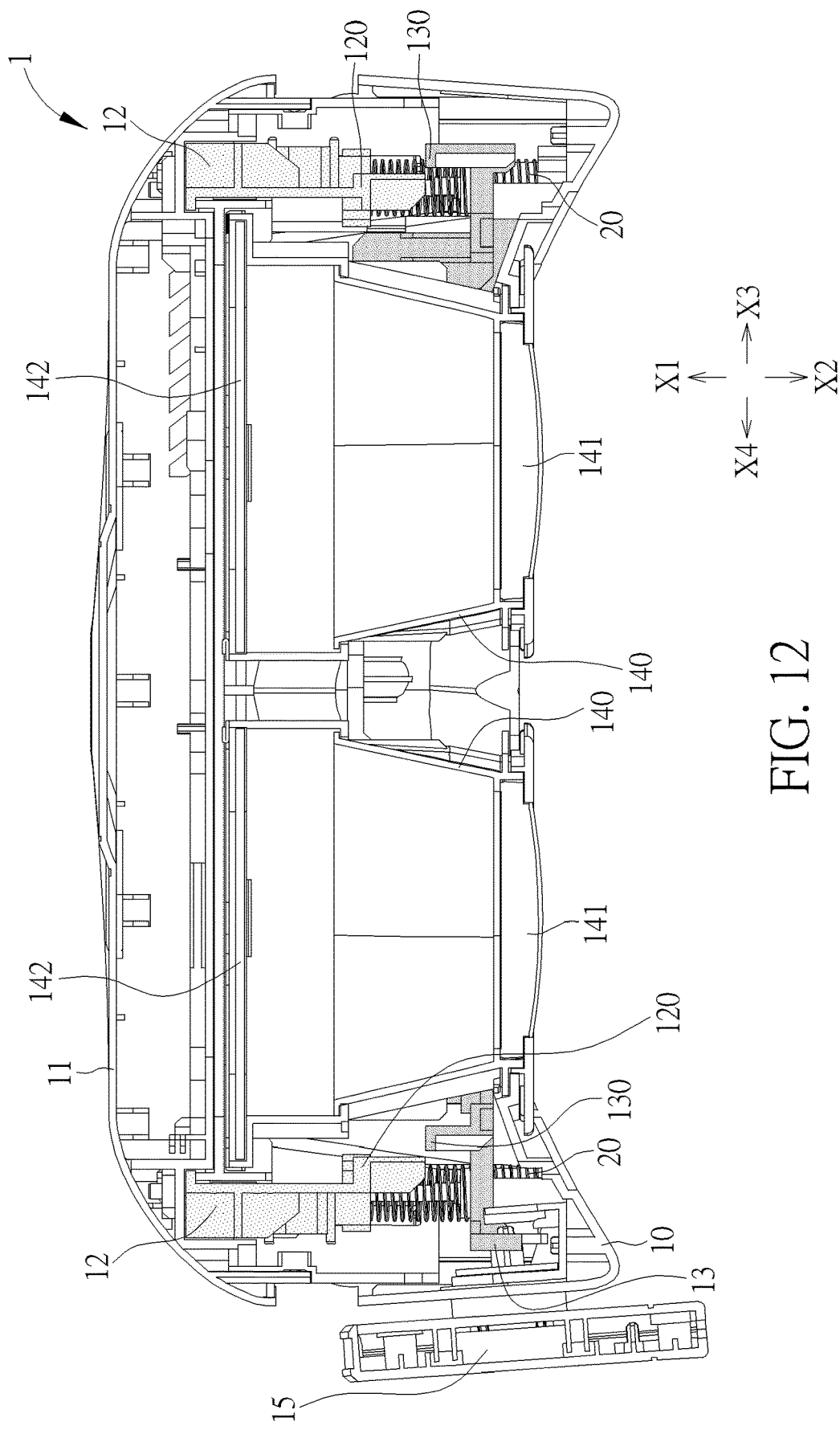
Figure 13:
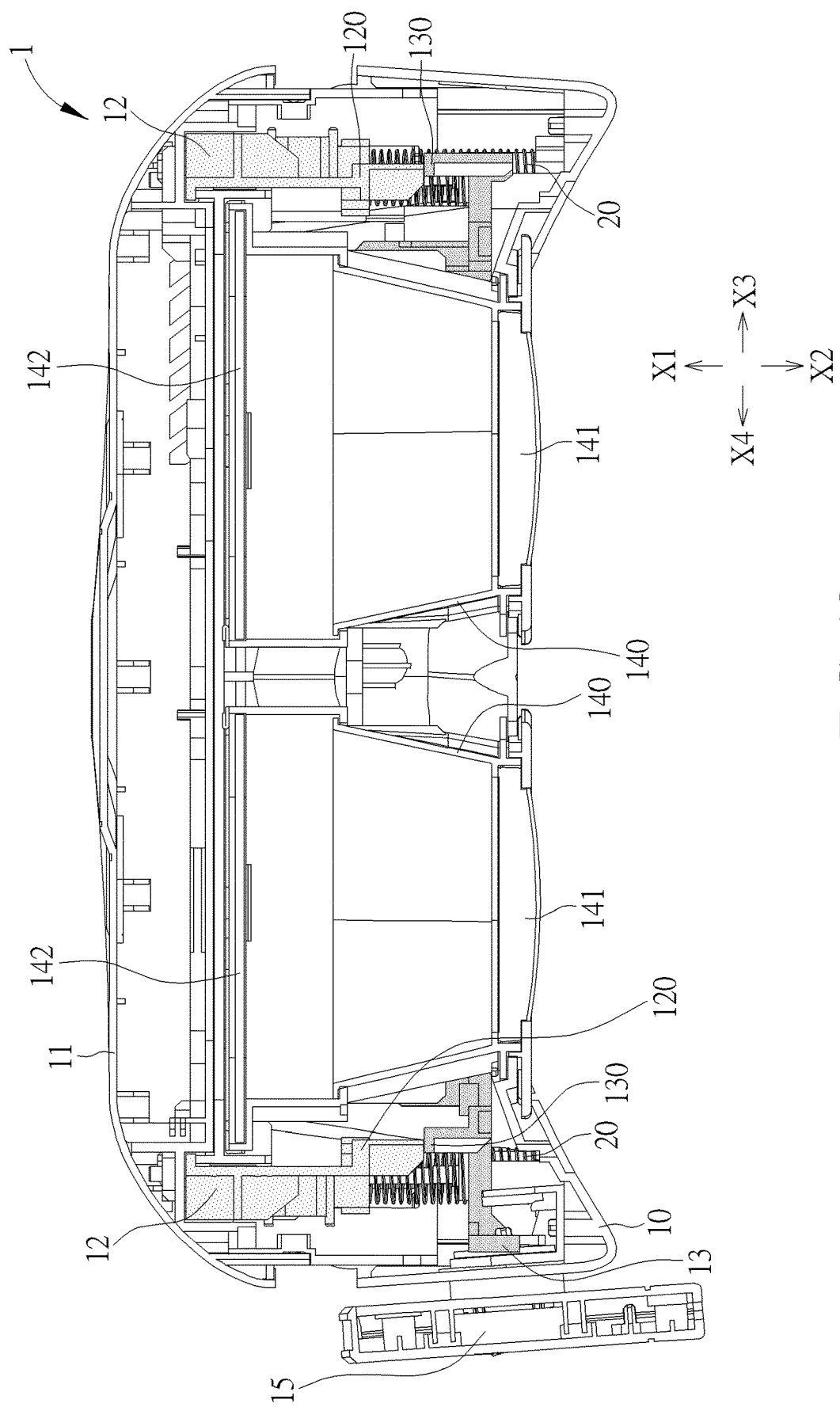

Please refer to FIG. 6 to FIG. 13. FIG. 10 to FIG. 13 are diagrams of the retractable virtual reality device 1 at different states according to the embodiment of the present invention. When it is desired to use the retractable virtual reality device 1, the first operating component 15 can be pressed to drive the second restraining component 13 to move from a position as shown in FIG. 10, to another position as shown in FIG. 11, along the third direction X3, so as to disengage the second restraining component 13 from the two restraining components 12, i.e., the recess structures 130 are driven to be separated from the corresponding protruding structures 120. At this moment, the two first recovering components 17 are forced to be deformed to generate recovering forces. Afterwards, the compressed four resilient components 20 push the two first restraining components 12 to move the front cover 11 away from the rear cover 10 and from a position as shown in FIG. 11, i.e., a folding position, to another position as shown in FIG. 12, i.e., the using position, along the first direction X1, so as to drive the two display components 142 to move relative to the two socket components 140 and the two lens assemblies 141 along the first direction X1. At this moment, the distances between the two display components 142 and the two corresponding lens assemblies 141 are extended to clearly focus the images onto the retinas of the user's eyes by the two lens assemblies 141. When the front cover 11 is located at the using position relative to the rear cover 10, the two first recovering components 17 drive the second restraining component 13 by the generated recovering forces of the two first recovering components 17 to move from a position as shown in FIG. 12, to another position as shown in FIG. 13, along the fourth direction X4, so as to drive the second restraining component 13 to abut against the two first restraining components 12, i.e., the recess structures 130 are driven to abut against the protruding structures 120 for restraining the two first restraining components 12 from moving along the second direction X2. In other words, at this moment, the two first restraining components 12 are prevented from moving along the second direction X2, so that the front cover 11 is prevented from moving relative to the rear cover 10, so as to fix the distances between the two display components 142 and the two corresponding lens assemblies 141. In such a way, the front cover 11 can be prevented from moving toward the rear cover 10 due to accidental operation when the front cover 11 is located at the using position, which ensures the images to be focused on the retinas of the user's eyes correctly.

Furthermore, the engaging portion 110 is aligned with the hook portion 162 of the second operating component 16 along the third direction X3 when the front cover 11 is located at the using position relative to the rear cover 10. Therefore, when it is desired to fold the retractable virtual reality device 1, the second operating component 16 can be operated to drive the hook portion 162 to move from a position as shown in FIG. 7, to another position as shown in FIG. 8, along the third direction X3, so as to engage the hook portion 162 with the engaging portion 110. During the aforementioned process, the abutting portion 161 is driven to push the second restraining component 13 to move from a position as shown in FIG. 13, to another position as shown in FIG. 12, along the third direction X3, so as to disengage the second restraining component 13 from the two first restraining components 12, i.e., the recess structures 130 are driven to be separated from the protruding structures 120. In such a way, the front cover 11 is allowed to move relative to the rear cover 10 along the second direction X2, so as to fold the retractable virtual reality device 1. It should be noticed that the two first recovering components 17 are forced to be deformed to generate recovering forces when the abutting portion 161 of the second operating component 16 pushes the second restraining component 13 to move the second restraining component 13 along the third direction X3. However, the second restraining component 13 is prevented from being driven to move along the fourth direction X4 by the recovering forces of the two first recovering components 17 due to engagement of the hook portion 162 of the second operating component 16 and the engaging portion 110. Therefore, at this moment, the second restraining component 13 does not interfere with the two first recovering components 12.

Afterwards, it only has to press the front cover 11 to drive the two first restraining components 12 to compress the four resilient components 20 along the second direction X2, so as to drive the two display components 142 to move relative to the two lens assemblies 141 along the second direction X2. Thus, the distances between the two display components 142 and the two lens assemblies 141 can be shortened for reducing an overall size of the retractable virtual reality device 1. When the front cover 11 leaves from the using position relative to the rear cover 10, the hook portion 162 is not aligned with the engaging portion 110 along the third direction X3, so that the engaging portion 110 and the hook portion 162 disengage from each other. Therefore, the second recovering component 18 can drive the second operating component 16 to recover along the fourth direction X4, so that the abutting portion 161 does not abut against the second restraining component 13 anymore. In such a way, the two first recovering components 17 can drive the second restraining component 13 by the generated recovering forces of the two first recovering components 17 to move from a position as shown in FIG. 10, to another position as shown in FIG. 9, along the fourth direction X4, so as to restrain the two first restraining components 12 from moving along the first direction X1, i.e., the recess structures 130 are driven to engage with the protruding structures 120, which restrains the front cover 11 from moving along the first direction X1 when the front cover 11 is located at the folding position relative to the rear cover 10.

In summary, the retractable virtual reality device of the present invention utilizes cooperation of the second restraining component movable disposed on the rear cover and the first restraining component disposed on the front cover for allowing the display component and the front cover to move relative to the rear cover. In such a way, when it is desired to use the retractable virtual reality device, the second restraining component can be operated to allow the front cover to move to the using position relative to the rear cover for extending the distance between the display component and the lens assembly. When the retractable virtual reality device is not in use, the second restraining component can be operated to allow the front cover to move to the folding position relative to the rear cover for shortening the distance between the display component and the lens assembly. Therefore, an overall size of the retractable virtual reality device can be reduced after being folded, which takes advantages of easy carry and storage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A retractable virtual reality device comprising:
    a rear cover;
    a front cover movably combined with the rear cover, the front cover being movable relative to the rear cover between a using position and a folding position along a first direction and a second direction opposite to the first direction;
    a first restraining component disposed on the front cover;
    a second restraining component movably disposed on the rear cover to optionally restrain the first restraining component; and
    a display module comprising:
        at least one lens assembly disposed on the rear cover; and
        at least one display component disposed on the front cover and spaced away from the at least one lens assembly at a distance between the at least one display component and the at least one lens assembly;
    wherein when the second restraining component is driven by an external force to disengage from the first restraining component, the front cover is allowed to move relative to the rear cover between the using position and the folding position to drive the at least one display component to move relative to the at least one lens assembly to adjust the distance between the at least one display component and the at least one lens assembly, and when the front cover is located at the using position or at the folding position relative to the rear cover, the second restraining component is driven to restrain the first restraining component to prevent the front cover from moving relative to the rear cover, so that the at least one display component is restrained from moving relative to the at least one lens assembly to fix the distance between the at least one display component and the at least one lens assembly.

2. The retractable virtual reality device of claim 1, wherein the display module further comprises at least one socket component, a side of the at least one socket component is adjacent to the at least one lens assembly and installed on the rear cover together with the at least one lens assembly, and another side of the at least one socket component opposite to the side of the at least one socket component is adjacent to the at least one display component.

3. The retractable virtual reality device of claim 1, wherein the display module further comprises at least one socket component, a side of the at least one socket component is adjacent to the at least one display component and installed on the front cover together with the at least one display component, and another side of the at least one socket component opposite to the side of the at least one socket component is adjacent to the at least one lens assembly.

4. The retractable virtual reality device of claim 1, further comprising a first operating component disposed on the rear cover in a movable manner along a third direction perpendicular to the first direction and connected to the second restraining component, the first operating component driving the second restraining component to move along the third direction so as to disengage the second restraining component from the first restraining component when the first operating component is driven by the external force.

5. The retractable virtual reality device of claim 4, further comprising at least one first recovering component disposed between the second restraining component and the rear cover to bias the second restraining component to recover along a fourth direction opposite to the third direction.

6. The retractable virtual reality device of claim 5, wherein the at least one first recovering component drives the second restraining component to restrain the first restraining component when the front cover is located at the using position or the folding position relative to the rear cover.

7. The retractable virtual reality device of claim 6, further comprising a second operating component disposed on the rear cover in a movable manner along the third direction, the second operating component pushing the second restraining component to move along the third direction to disengage the second restraining component from the first restraining component during a process that the second operating component moves relative to the rear cover along the third direction to engage with the front cover.

8. The retractable virtual reality device of claim 7, wherein the second operating component comprises:
an operating portion exposed out of the rear cover;
an abutting portion connected to the operating portion to push the second restraining component; and
a hook portion connected to the operating portion to engage with the front cover;
wherein the operating portion drives the abutting portion to push the second restraining component to move along the third direction to disengage the second restraining component from the first restraining component during a process that the operating portion drives the hook portion to move along the third direction to engage with the front cover.

9. The retractable virtual reality device of claim 8, wherein an engaging portion is formed on the front cover, when the front cover is located at the using position relative to the rear cover, the engaging portion is aligned with the hook portion along the third direction, so that the hook portion driven by the operating portion engages with the engaging portion, when the front cover is located at the folding position relative to the rear cover, the engaging portion is not aligned with the hook portion along the third direction, so that the hook portion driven by the operating portion is prevented from engaging with the engaging portion.

10. The retractable virtual reality device of claim 7, further comprising a second recovering component disposed between the second operating component and the rear cover to bias the second operating component to recover along the fourth direction opposite to the third direction.

11. The retractable virtual reality device of claim 1, further comprising at least one resilient component disposed between the front cover and the rear cover, the at least one resilient component driving the front cover to move relative to the rear cover to the using position along the first direction when the second restraining component disengages from the first restraining component.

12. The retractable virtual reality device of claim 11, further comprising at least one positioning column, an end of the at least one positioning column passing through the first restraining component to be fixed onto the front cover, another end of the at least one positioning column being movably connected to the rear cover, the at least one resilient component being sheathed on the at least one positioning column, and two ends of the at least one resilient component abutting against the first restraining component and the rear cover respectively.

13. The retractable virtual reality device of claim 12, wherein a sectional area of the at least one positioning column gradually increases along the second direction.

14. The retractable virtual reality device of claim 1, wherein the display module comprises two socket components parallel to each other, two lens assemblies parallel to each other, and two display components parallel to each other.

* * * * *